United States Patent [19]
Ariyavisitakul et al.

[11] Patent Number: 5,333,175
[45] Date of Patent: Jul. 26, 1994

[54] METHOD AND APPARATUS FOR DYNAMIC POWER CONTROL IN TDMA PORTABLE RADIO SYSTEMS

[75] Inventors: Sirikiat Ariyavisitakul, Tinton Falls; Justin C. Chuang, Holmdel; Nelson R. Sollenberger, Tinton Falls, all of N.J.

[73] Assignee: Bell Communications Research, Inc., Livingston, N.J.

[21] Appl. No.: 10,111

[22] Filed: Jan. 28, 1993

[51] Int. Cl.$^5$ .............................................. H04M 11/00
[52] U.S. Cl. ................................... 379/58; 455/38.3; 455/69; 455/127
[58] Field of Search .................... 379/58, 63; 370/95.3; 455/38.3, 69, 88, 127, 343

[56] References Cited

U.S. PATENT DOCUMENTS

| | | | |
|---|---|---|---|
| 4,309,771 | 1/1982 | Wilkens | 455/69 |
| 4,580,262 | 4/1986 | Naylor et al. | 455/69 |
| 4,849,991 | 7/1989 | Arnold et al. | |
| 4,937,841 | 6/1990 | Chuang et al. | |
| 4,941,155 | 7/1990 | Chuang et al. | |
| 5,084,891 | 1/1992 | Ariyavisitakul et al. | |
| 5,086,508 | 2/1992 | Furuno | 455/127 |
| 5,128,965 | 7/1992 | Henriksson | 455/69 |
| 5,155,742 | 10/1992 | Ariyavisitakul et al. | |
| 5,177,769 | 1/1993 | Arnold et al. | |
| 5,204,970 | 4/1993 | Stengel et al. | 455/69 |
| 5,220,678 | 6/1993 | Feei | 455/127 |
| 5,241,565 | 8/1993 | Kloc et al. | 455/127 |
| 5,241,690 | 8/1993 | Larsson et al. | 455/69 |
| 5,257,283 | 10/1993 | Gilhousen et al. | 455/38.3 |
| 5,267,262 | 11/1993 | Wheatley, III | 455/69 |

OTHER PUBLICATIONS

"Portable Digital Radio Communications—An Approach to Tetherless Access", Donald C. Cox, *IEEE Communications Magazine*, Jul. 1989, pp. 30–40.
"Universal Digital Portable Radio Communications", Donald C. Cox, *Proceedings of the IEEE*, vol. 75, No. 4, Apr. 1987, pp. 436–477.
"An Overview of the Application of Code Division Multiple ACCESS(CDMA) to FPLMTS Networks", M. Epstein, QUALCOMM, Inc. Jun. 18, 1992 pp. 1–39.
"On the System Design Aspects of Code Division Multiple Access(CDMA) Applied to Digital Cellular and Personal Communications Networks", A. Salmai, K. Gilhousen, IEEE 1991, pp. 57–62.

*Primary Examiner*—Curtis Kuntz
*Assistant Examiner*—Dwayne D. Bost
*Attorney, Agent, or Firm*—Leonard Charles Suchyta; Stephen M. Gurey

[57] ABSTRACT

In a TDM/TDMA portable radio communications system the uplink power transmitted by the transmitter of a portable unit to a fixed port is dynamically controlled by monitoring three measures in each uplink burst received by the port. These measures are a received signal strength indicator (RSSI), a quality measure (QM), and a word error indicator (WEI). The WEI is used to adjust an RSSI threshold upward and downward. If the QM is below a predetermined QM threshold or the RSSI is below the current value of the adjustable RSSI threshold, then additional uplink power is required, unless the RSSI is greater than a predetermined maximum RSSI value. If additional power is required a power control bit (PC), included within each downlink burst transmitted to the portable, is set to ONE and the portable, in response thereto, increases its output transmitter power. If both the QM is greater than the predetermined QM threshold and the RSSI is greater than the RSSI threshold, or if the RSSI is greater than the predetermined maximum RSSI value, then PC is set to ZERO and the portable transmitter power is decreased.

41 Claims, 5 Drawing Sheets

METHOD AND APPARATUS FOR DYNAMIC POWER CONTROL IN TDMA PORTABLE RADIO SYSTEMS

BACKGROUND OF THE INVENTION

This invention relates to controlling the power output of a portable unit or a port in a frequency-reusing radio communications system such as a time division multiplexed/time division multiple access (TDM/TDMA) system used for low power portable digital telephony.

People by their very nature are highly mobile; no where is this more true than in modern day society with its myriad forms of travel. At the same time, many people increasingly have a need to be able to telephonically communicate with others particularly while they are on "the go", i.e. while they are moving.

However, this need for mobile communications, which existed for quite some time, has remained basically unsatisfied. Since telephones traditionally have cords, any movement of the telephone was traditionally limited by the length of its cord. For many years, only a veritable handful of telephones actually traveled with their users. These mobile telephones included aeronautical, marine and other forms of early radio telephones. Inasmuch as these mobile telephones were priced well beyond the affordability of the average telephone subscriber, none of these radio telephones ever encountered widespread use. Accordingly, for the vast majority of subscribers, a telephone set was installed at each subscriber location and there it remained unless it was reinstalled elsewhere. Thus, these subscribers either remained close to their telephone and thus restricted their mobility particularly in the anticipation of receiving a telephone call, or intentionally sought out a public or private telephone located along their route of travel whenever the need arose to place a telephone call.

Now with increasing sophistication of miniaturized electronic technology and decreasing attendant cost thereof, various vendors provide a number of devices (and/or services) that offer tetherless telephony. These devices, explained in more detail below, attempt to free a subscriber from being bound by the ambulatory constraints imposed by existing wireline telephone sets. In effect, each of these devices now permits subscribers effectively, at least to a certain extent, to take their telephone with them, obtain exchange access, and remain in communication wherever they go. These devices include cordless telephones, cellular mobile radio transceivers, public packet radio data network transceivers and radio pagers. As a growing number of consumers perceived the freedom of movement offered by these devices, a large demand was created for these devices. Moreover and not unexpectedly, as the prices of these devices continue to fall due to manufacturing economies and technical developments, the demand for these devices correspondingly continues to substantially increase. Specifically, more than 25 million cordless telephone sets are in use today throughout the United States with demand for these sets continuing to rise as the price of cordless telephones with increasing sophisticated has remained within a $100.00 to $200.00 range. In addition, more than three million cellular telephone sets are currently in use throughout the United States. As the price of various cellular sets falls from more than a $1000.00 which occurred merely a year ago to only a few hundred dollars today, the demand for these sets has increased precipitously. As a result, the number of installed sets has climbed at such an astonishing rate that in certain urban areas, such as New York, the number of sets in use at peak times is beginning to strain the capacity of the existing cellular network to handle the concomitant call traffic.

While, each of the present tetherless telephonic technologies possesses certain advantages, each technology also unfortunately has certain drawbacks that significantly restrict its use. In this regard, see, e.g., Cox, "Portable Digital Radio Communications—An Approach to Tetherless Access", IEEE Communications Magazine, Vol. 27. No. 7, July 1989 pages 30–40; and Cox, "Universal Digital Portable Radio Communications", Proceedings of the IEEE, Vol. 75, No. 4, April 1987, pages 436–476.

Specifically, as to cordless telephones, such a telephone consists of two transceivers: a base unit and a handset, that collectively form a low power duplex analog radio link. The base unit is connected, typically by a subscriber to a wireline access point in a conventional telephone network in lieu of or as a replacement for a wireline telephone, in order to implement a tetherless substitute for a telephone cord. Once connected, the base unit appears to the telephone network as a conventional telephone. The base unit contains a transmitter and a receiver, and simple control and interface apparatus for dialing, accepting ringing, terminating calls and coupling voice from the telephone line to the transmitter and from the receiver within the base unit to the telephone line. The handset, which is truly portable, contains simple control logic for initiating, receiving and terminating calls with the base unit and for turning its own transmitter on and off. To provide true duplex operation, separate carrier frequencies are used by the transmitters in the base unit and handset. Since cordless telephones operate with very low input power to their transmitter, usually on the order of only several milliwatts, the handset generally utilizes several small rechargeable batteries as its power source. This enables the handset to be made relatively small, lightweight and to be continuously used for a relatively long period, typically several hours, before its batteries require recharging. Furthermore, the very low level of power radiated from the handset poses essentially no biological radiation hazard to its user.

Unfortunately, the primary disadvantage of cordless telephones is their highly limited service area. Because cordless telephones use relatively low transmitter power, these telephones have a maximum range that varies from typically a few hundred to a thousand feet, which in turn results in a very small service area. A secondary disadvantage associated with cordless telephones stems from the limited number of available frequencies. At present, only a few separate frequencies, typically up to 10 duplex channels, have been allocated by the Federal Communications Commission (FCC) for use by cordless telephones. Moreover, early cordless telephones by their very design have been very susceptible to co-channel interference. This interference arises by the simultaneous operation of two or more cordless telephones situated in close proximity to each other, such as in an immediate neighborhood of a residential area. In a very small geographic area with a very low density of users, a reasonable probability exists that within this area one or more duplex pairs will not be in use at any one time, and, as such, this interference will not occur therein. Nevertheless, in an effort to avoid this interference, relatively sophisticated cordless telephones are now capable of operating on any one of a number of preprogrammed duplex pairs with either the user or the telephone itself selecting, manually in the case of the user and automatically by the telephone, the specific pair that is to be used at any one time. Unfortunately, if a sufficient number of cordless telephones are in use in a very densely populated area, such as an apartment building, pair selection may not be sufficient to eliminate the expected incidences of co-channel interference that results from undisciplined and uncoordinated duplex pair assignment and the resulting chaos experienced by users situated therein. In addition, since cordless telephones rely on analog modulation of a duplex pair, conversations occurring over a cordless telephone are highly vulnerable to eavesdropping. Furthermore, a cordless telephone only provides limited protection against unauthorized long distance or message units calls being made therethrough. While preprogrammed digital or tone access codes are being used between individual handset-base unit pairs and provide sufficient protection against casual attempts at unauthorized access, these codes are not sufficiently sophisticated to successfully deter a determined orderly assault On a cordless telephone by an unauthorized user. Furthermore, while cordless telephones provide limited portable radio access to a wireline access point, from a network standpoint cordless telephones do not eliminate the need for telephone lines, i.e. a customer drop, to be run to each subscriber.

Nonetheless, in spite of these severe service restrictions, cordless telephones are immensely popular for the freedom, though very limited, that they furnish to their users.

In contrast to the very limited range provided by cordless telephones, cellular mobile radio systems accommodate wide ranging vehicular subscribers that move at relatively high speeds. These systems utilize a relatively high power 850 MHz transmitter, typically operating at an input of approximately 0.5 watt to several tens of watts, in a mobile unit with a relatively high efficiency antenna to access a wireline telephone network through a fixed cell-site (base station). The base station also uses a high power transmitter in conjunction with a tall antenna, typically erected on a tower or tall building, to provide a relatively large coverage area. Due to the expense, typically ranging to $300,000 exclusive of land and building costs, and the antenna size associated with each base station, the least number of base stations are often used to cover a given area. Nonetheless, this arrangement generally provides a circular service area centered on a base station with a radius of approximately 5-10 miles therefrom. In use, a cellular radio system that covers a large region often encompassing a city, its suburbs and major access highways typically includes a number of geographically dispersed base stations. The base stations, containing radio receivers and transmitters and interface and control electronics, are connected by trunks to and coordinated and controlled by one or more Mobile Telephone Switching Offices (MTSOs) that, in turn, also provide access to the conventional wireline telephone network. All of the duplex radio channels available to the entire system are sub-divided into sets of channels. The radio equipment in each base station has the capability of using channels from one of the channel sets. These sets are allocated to the base station in a pattern that maximizes the distance between base stations that use the same sets so as to minimize average co-channel interference occurring throughout a service region. One or more channels are designated for initial coordination with the mobile sets during call setup.

Each mobile (or hand-held) cellular transceiver used in the system contains a receiver and a transmitter capable of operating on any duplex radio channel available to the cellular system. Calls can be made to or from any mobile set anywhere within the large region covered by a group of base stations. The control electronics in the mobile transceiver coordinates with a base station on a special call setup channel, identifies itself, and thereafter tunes to a channel designated by the base station for use during a particular call. Each duplex channel uses one frequency for transmission from base-to-mobile and a different frequency for transmission from mobile-to-base. The signal strength of calls in progress is monitored by the base stations that can serve those calls. Specifically, when the signal strength for a given call drops below a predetermined threshold, typically due to movement of the cellular subscriber from one cell to another, the MTSO connected to that base station coordinates additional signal strength measurements from other base stations which surround the station that is currently handling the call. The MTSO then attempts to switch ("handoff") the call to another duplex channel if one of the other base stations is receiving a stronger signal than that being received at the base station that is currently handling the call. This handoff of calls, totally transparent to the cellular subscriber, preserves the quality of the radio circuit as the subscriber moves throughout the service region. Moreover, calls are handed off from one MTSO to another, as the subscriber transits from one service area into another. Inasmuch as frequency usage is coordinated, relatively efficient use is made of the available frequency spectrum while minimizing the likelihood co-channel interference. In each different geographic service area within the United States, there are two competing cellular systems using different frequencies.

Though cellular mobile radio systems provide wide range, these systems suffer various drawbacks. First, cellular systems were originally designed for use in motor vehicles whose electrical systems could readily provide sufficient power. While portable hand-held cellular transceivers do exist, they must operate with sufficient transmitter input power, typically at least 0.5 watt, to reliably reach a base station. This, in turn, requires that a relatively large battery must be used within the portable cellular transceiver. However, due to the limits of present rechargeable battery technology, the amount of time that the portable transceiver can be used before it requires recharging is often quite limited. Furthermore, the cost of these rechargeable batteries and hence of the portable transceiver is rather high. Moreover, high radiated power levels, such as that which emanate from a mobile or portable cellula transceiver, may be sufficient to pose a potential biological radiation hazard to its user. Furthermore, since cellular systems were not designed to compensate for radio attenuation occurring within buildings, these systems are only able to provide little, if any, service within a building. Low power portable cellular transceivers are not operationally compatible with large cell sizes, designed to match the needs of fast moving vehicular users, and thus often provide poor communication in many areas within these cells. In addition, since cellular systems rely on merely frequency modulating a carrier with voice or data, these systems are also susceptible to eavesdropping. Lastly, from a network perspective, cellular systems are quite inefficient. Due to the inclusion of MTSOs with trunks connected to individual base stations, backhaul of cellular traffic over wired trunks often occurs over several miles prior to its entrance into the wireline network, thereby resulting in a wasteful overbuild of network transport facilities.

Public packet radio data networks presently exist to handle infrequent bursts of digital data between a fixed base station and a number of portable data transceivers. The fixed site has a transmitter that uses several tens of watts; while each portable data transceiver uses a transmitter that operates at a level of several watts. As such, reliable coverage is provided over a service area that may extend several miles in radius from a base station. Individual base stations are connected by a fixed distribution facility to a controller that can, in turn, be connected to either a local exchange network, to handle voice-band data, or a packet-data network which itself interconnects various computers. Multiple users contend for transmission time on typically a single radio channel. Data transmissions on the channel are set up in either direction through bursts of coordinating data, handshaking, that occur between a base station and a portable data transceiver. Appropriate controller and radio link protocols are used to avoid packet collisions. Once a data transfer is complete between that base station and a data transceiver, the channel is immediately available for reuse by others. Although data bursts are transmitted at relatively high power, each burst is transmitted for only a short duration. As such, the average power consumption for a portable data transceiver is far less than that associated with a portable cellular transceiver thereby allowing physically smaller internal batteries to be used with portable data transceivers than those used in portable cellular transceivers. Nevertheless, the high radiated power levels associated with a portable data transceiver again pose a potential biological radiation hazard to its user. In addition, these networks disadvantageously suffer from limited digital transmission capacity which restricts these networks to carrying short data bursts and not voice, and, like cellular systems, experience coverage restraints when used within buildings.

In contrast to the tetherless systems discussed above, radio paging systems provide simple unidirectional transmission from a fixed location to a specifically addressed portable pager, which when received provides an alerting tone and/or a simple text message. Paging systems provide optimized one-way communication over a large region through a high power transmitter, typically a few kilowatts, that uses high antennas at multiple sites to provide reliable coverage throughout the region. Satellite based paging systems are also in operation to provide extended service regions. Since a pager is merely a receiver with a small annunciator, its power requirement is very low. As such, a pager is quite small, light weight, reliable, relatively low cost, and can operate for long intervals before its batteries need to be recharged or replaced.

Due to the advantages in size, cost and operating duration offered by pocket pagers, attempts exist in the art, to impart limited two-way communication into paging systems which are themselves highly optimized for one-way traffic. One such attempt includes incorporation of an "answer back" message through "reverse" transmission links between the individual pagers and the fixed sites. While these attempts have met with great difficulty, these attempts nevertheless indicate that a substantial demand exists for an inexpensive two-way portable truly tetherless telephonic service that overcomes the range limitations associated with cordless telephones and the weight and cost limitations associated with portable cellular systems.

Furthermore, various intelligent network services are now being offered by the local telephone operating companies in an attempt to provide wireline subscribers with a certain degree of call mobility when they are away from their own wireline telephones. These services include call transfer and call forwarding. Both call transfer and call forwarding allow a subscriber to program a local switch, using any pushbutton telephone, to transfer all subsequently occurring incoming calls that would otherwise be routed to this subscriber's telephone to a telephone associated with a different wireline telephone number that the subscriber desires anywhere in the world either for a given period of time, as in call transfer, or until that subscriber appropriately reprograms the switch with a different forwarding number, as in call forwarding. In this manner, the subscriber can, to a certain extent, continually instruct the telephone network to follow his or her movements and thereby route his or her incoming calls to a different number in unison with that subscriber's actual route of travel. Unfortunately, with these services, the subscriber must manually interact with the network and continually enter a new forwarding telephone number(s) coincident with his or her continuing travel such that the network is always cognizant of the current telephone number to which his calls are to be forwarded.

Thus, a substantial overall need exists in the art for a truly portable personal communication technology that is designed for pedestrian use and which utilizes small, lightweight and relatively inexpensive portable transceivers while eliminating, or at least substantially reducing, the performance drawbacks associated with the use of currently existing tetherless telephonic technologies in portable communication applications.

In an attempt to provide this needed technology, the art has turned to low power portable digital telephony. In essence, this technology, similar to cellular radio, uses a fixed base unit (hereinafter referred to as a port) and a number of mobile transceivers (hereinafter referred to as portables) that can simultaneously access that port on a multiplexed basis. However, in contrast to cellular radio, portable digital telephony uses low power multiplexer radio links that operate on a time division multiplexer/time division multiple access (TDM/TDMA) basis to provide a number of separate fully duplex demand-assigned digital channels between a port and each of its associated portables. Specifically, each port would transmit time division multiplexer (TDM) bit streams on a predefined carrier frequency, with, in turn, each portable that accesses that port responding by transmitting a TDMA burst on a common though different predefined carrier frequency from that used by the port. Quadrature phase shift keying (QPSK), with an inter-carrier spacing of 150 to 300 KHz and within a given operating frequency band situated somewhere between approximately 0.5 to 5 GHz would be used by both the port and portables. The power used by the transmitter in the portable would range between 5–10 milliwatts or less on average and provide a range of several hundred to a thousand feet. As such, the resulting low radiated power would pose essentially no biological radiation hazard to any user. In addition, the port antenna would be relatively small and suitable for mounting on a utility or light pole. With this transmission range, a port could simultaneously serve typically 20-30 separate locally situated portables. The same TDM channels would be reused at ports that are spaced sufficiently far apart to reduce co-channel interference to an acceptably low level but yet conserve valuable spectrum. To provide access to the wireline telephone network, each port would be interfaced, typically through a conventional fixed distribution facility, over either a copper or fiber connection to a switching machine at a local central office. The switching machine would be suitably programmed, in a similar manner as is an MTSO, to controllably and automatically handoff calls from one port to another as subscribers move their portables from port to port.

Due to the very limited transmitter power, each portable is anticipated to be very light-weight, physically small and provide a relatively long operating life between battery recharging or replacement. The cost to a subscriber for a portable is expected, through very large scale integrated (VLSI) circuit implementations, to reside in the range of $100.00 to $350.00. In addition, each port would require a relatively small electronic package and carry an overall expected cost of less than $25,000.00—which is far less, by at least an order of magnitude, than that of a current cellular base station. Moreover, the digital data carried on each channel could be readily encrypted to provide a desired degree of security and privacy against eavesdropping. Furthermore, with this technology, a port antenna, due to its small size, could be readily moved within a building to cope with signal attenuation occurring therein. Port spacings would be properly established within the building and frequency reuse would be properly controlled between these ports to provide portable service having an acceptably low level of co-channel interference to a high density of users situated therein.

From a network perspective, low power portable digital telephony is extremely attractive. At present, approximately $50-100 billion is invested by local operating telephone companies in costs associated with copper subscriber loops that run from distribution points to local telephone company demarcation points on individual customer drops. For a local telephone company, the per-subscriber cost of installing and maintaining a subscriber loop is generally greater at the loop end closest to a subscriber than at the far end thereof since the loop end is more dedicated to that subscriber than the far end is. Given the range provided by portable low power telephony, ports can be appropriately positioned throughout an area to provide radio link based exchange access and thereby substitute inexpensive mass produced VLSI circuitry for costly dedicated copper loops that would otherwise emanate from a distribution facility to an individual subscriber. Hence, by installing various ports throughout for example a building, significant labor intensive installation and maintenance tasks associated with rewiring of telephone drops and relocation of telephone equipment would be eliminated with substantial savings being advantageously realized in attendant subscriber costs as people are moved from office to office therein.

Now, with the attractiveness of low power portable digital telephony being readily apparent, its success, in great measure, hinges on achieving satisfactory performance through the use of TDMA. Various aspects of TDMA have been treated in prior art patents and patent applications such as U.S. Pat. No. 4,849,991, entitled "Method and Circuitry for Determining Symbol Tinting for Time Division Multiple Access Radio Systems," issued Jul. 18, 1989 to H. W. Arnold and N. R. Sollenberger, the latter a co-inventor herein; U.S. Pat. No. 4,937,841, entitled "Method and Circuitry for Carrier Recovery for Time Division Multiple Access Radio Systems," issued Jun. 26, 1990 to J. C. Chuang, also a co-inventor herein, and N. R. Sollenberger; U.S. Pat. No. 4,941,155, entitled "Method and Circuitry for Symbol Timing and Frequency Offset Estimation in Time Division Multiple Access Radio Systems," issued Jul. 10, 1990 also to J. C. Chuang and N. R. Sollenberger; U.S. Pat. No. 5,084,891, entitled "A Technique for Jointly Performing Bit Synchronization and Error Detection in a TDM/TDMA System," issued Jan. 28, 1992 to S. Ariyavisitakul, also a co-inventor herein, L. F. Chang and N. R. Sollenberger; U.S. Pat. 5,155,742, entitled "Time Dispersion Equalizer Receiver with a Time-Reversal Structure for TDMA Portable Radio Systems", issued Oct. 13, 1992 to S. Ariyavisitakul and H. W. Arnold; and U.S. Pat. No. 5,177,769, entitled "Digital Circuits for Generating Signal Sequences for Linear TDMA Systems", issued Jan. 5, 1993 to H. W. Arnold and N. R. Sollenberger.

Co-pending patent applications include Ser. No. 07/619,059, filed Nov. 28, 1990 by J. C. Chuang and N. R. Sollenberger, U.S. Pat. No. 5,212,831, which deals with a method and apparatus for autonomous adaptive frequency assignment in a TDMA portable radio system; Ser. No. 07/695,524, filed May 3, 1991 by S. Ariyavisitakul and H. W. Arnold, U.S. Pat. No. 5,222,101, which discloses a phase equalizer for use in a TDMA portable radio system; and Ser. No. 07/880,054 filed May 7, 1992 by J. C. Chuang, U.S. Pat. No. 5,226,045, which discloses a method and apparatus for autonomous selective routing during radio access in a TDMA portable radio system.

The various proposed TDMA portable radio system architectures have incorporated portable-initiated processes to access the telephone network. Specifically, the portable unit selects a channel (i.e., both the port and time-slot) based on the signals received in the downlink (port to portable) direction. Downlink performance is optimized by selecting the port that provides the best downlink quality (i.e., signal-to-impairment ratio) from among all available ports. In order to achieve good link performance in both directions, however, additional processes must be employed to provide adequate performance on the uplink (portable to port). In particular, a dynamic uplink power control can improve uplink performance through several mechanisms. Firstly, interference to co-channel ports can be reduced by controlling the power level in the uplink direction so that the portable unit produces an output with only that minimum power necessary for the port to receive a sufficient quality uplink signal from the portable unit. Also, an uplink power control that can track short-term fading so that the port receives essentially a constant power level signal from the portable enables both power consumption by the portable unit and signal impairment at the port to be minimized. Generally, without power control, a system is designed so that most portable units transmit more power than is required to provide acceptable performance in order to account for worst-case conditions when the port and portable might be disadvantageously positioned with respect to each other or would be subject to short-term fading. The power output of a portable unit which is advantageously topologically positioned with respect to the port will therefore be much higher than is necessary for satisfactory link performance, thereby causing excessive interference at other ports. In addition to improving uplink performance by maintaining the received power at a port at an essentially constant level, a power control mechanism will advantageously reduce the power consumption of the portable unit. Battery power can thereby be saved enabling either prolonged use of the portable before its battery requires recharging, or use of a smaller capacity battery in the portable unit, which would beneficially reduce the size and weight of the portable unit.

An object of the present invention is to reduce power consumption of the portable unit and to improve uplink performance by dynamically controlling the power output of the portable unit in such a manner that an essentially constant power level is received by the port.

An additional object of the present invention is to extend the method and apparatus of uplink power control of the present invention for also controlling the downlink power transmitted by a port to a portable over a particular channel and on a particular time-slot.

SUMMARY OF THE INVENTION

The output power of a portable unit that is communicating with a port (or the output power of a port that is communicating with a portable on a particular channel and time slot) is dynamically controlled by a power control bit that is transmitted each frame from the port to the portable unit (or from the portable to the port). Each burst received and processed by the port from the portable unit (or vice versa), provides three measures: a received signal strength indicator (RSSI), a word error indicator (WEI), and a quality measure (QM). The RSSI is obtained by integrating the received power, which is a combination of desired signal, noise and interference, over the entire burst. The WEI is an error flag which is set to ONE if a codeword contained in a burst is detected to be received in error by the channel coder. The QM is a measure of signal-to-impairment (SIR) ratio. At each frame, based on a combination of the QM, the RSSI and the WEI, a power control bit is formed and transmitted downlink to signal for either an increase or decrease of the portable output power (or transmitted uplink to signal for either an increase or decrease of the port output power on that channel and time slot). Specifically, if either the QM is below a preset minimum threshold or the RSSI is below a preset minimum threshold, then an increase in the portable unit's (or port's) transmit power is required, and the power control bit transmitted to the portable (or to the port) is set to ONE to signal for an increase the power. Otherwise, the power control bit is set to ZERO for a decrease in power. When a port receiver (or portable) is in an overload condition, however, the QM will be degraded because of distortion, thereby calling for a power increase when in fact a power decrease is required. An overload condition, however, increases the RSSI, which is detected by the RSSI detector. Therefore, if the RSSI rises above a preset maximum desired level, the power control bit is forced to ZERO, calling for a power decrease, regardless whether the QM is above or below its threshold value. The word error indicator (WEI) is used to adaptively adjust the RSSI threshold. When the word error flag is ONE, a transmission error has occurred indicating the potential presence of a significant transmission impairment that also affects the RSSI. Thus, when WEI is ONE, in order to initiate fast action, the RSSI threshold is immediately increased by a fixed predetermined number of dBs, which thereby causes the opposite end to adjust its power output upward each frame (if the RSSI is below the new threshold) until the new RSSI threshold is reached. In order, however, to prevent likely consecutive errors in successive frames from increasing the RSSI threshold each frame, no RSSI threshold adjustments are made following an upward adjustment for a fixed window period of N frames. In each frame outside that window in which the error flag WEI is ZERO, the RSSI threshold is decreased by a fraction of the increase imparted to the RSSI threshold in response to a transmission error. In that way the RSSI threshold is slowly reduced frame-by-frame until the next frame in which the error flag is again set to ONE and the the RSSI threshold is adjusted upward.

DETAILED DESCRIPTION

Figure 1:
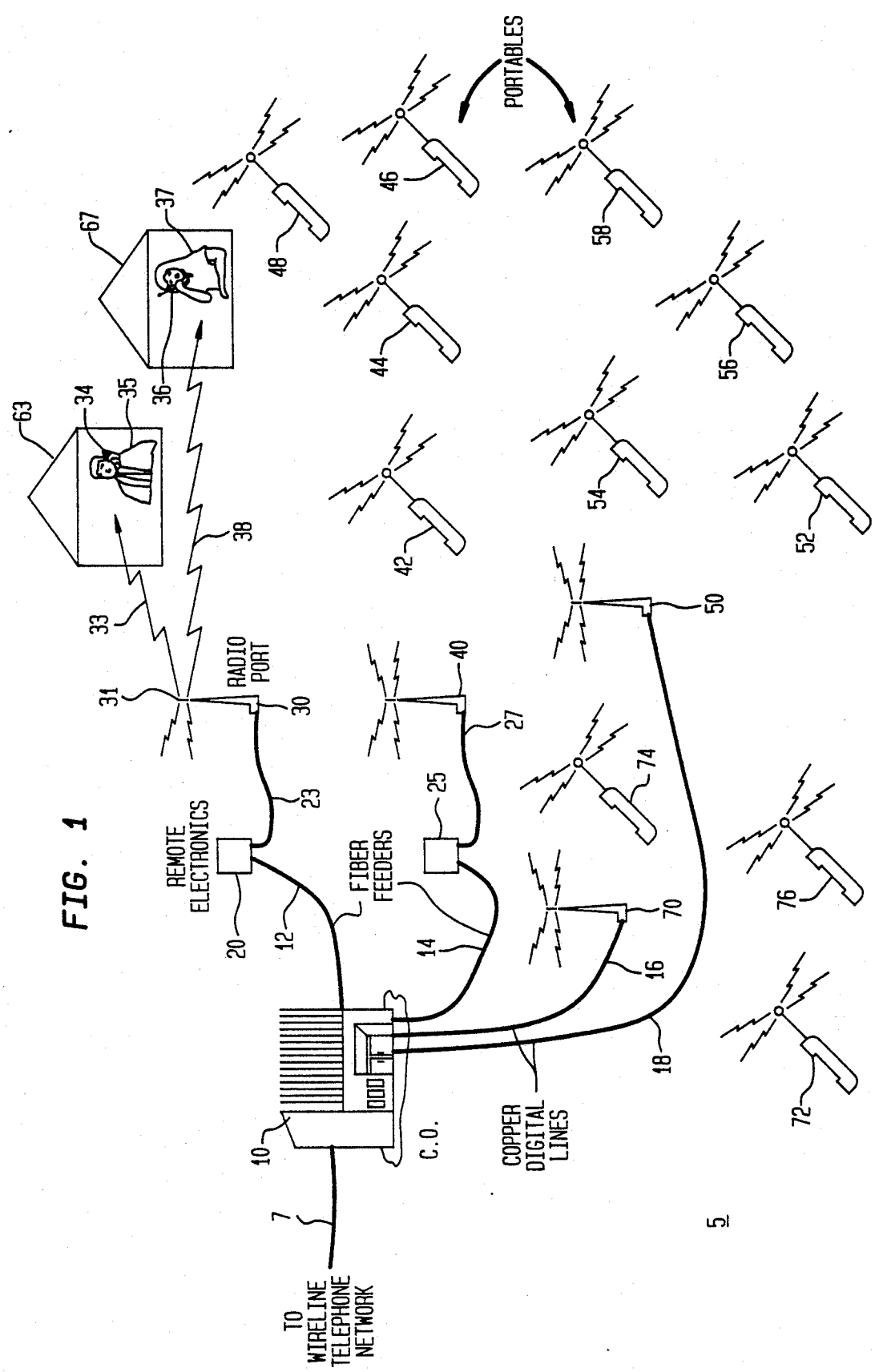
FIG. 1 shows a portable radio system using radio ports to provide tetherless communications.

An overall diagram of a low power portable TDM/TDMA digital telephony system 5 is shown in FIG. 1. Low power digital portable telephony utilizes a fixed base unit (referred to as a "port") and a number of mobile transceivers (each of which is referred to as a "portable"). Through use of time division multiple access (TDMA), each portable can access the port through a separate demand-assigned TDMA channel to carry duplex communication on a time division multiplexed (TDM) basis therebetween. The power used by the transmitter in each portable would range between 5-10 milliwatts or less on average and provide a range of several hundred to a thousand feet between a port and each of its portables. To accommodate a relatively large service area, several ports are used with individual calls being successively handed off from port to port as their corresponding callers carry their portables from the service area associated with one port to that of an adjacent port. An appropriate switch (not shown) which is located within a local central end office is suitably programmed to operate in a similar manner as does a mobile telephone switching office in order to controllably handoff calls from port to port as the callers transit corresponding local service areas associated therewith.

Specifically, system 5 contains four ports 30, 40, 50 and 70 and respective portables 34 and 36; 42, 44, 46 and 48; 52, 54, 56 and 58; and 72, 74 and 76. The ports themselves are connected to the switch located within central office 10 to provide access to a wireline telephone network. This connection can typically occur in one of two ways: either through copper digital lines 16 and 18 for illustratively ports 70 and 50, respectively, or via intermediary copper digital lines 23 and 27 to remote electronics 20 and 25 for illustratively ports 30 and 40, respectively. The remote electronics contain fixed distribution and concentration facilities for multiplexing traffic, in addition to that provided by ports 30 and 40, onto fiber feeders 12 and 14 which, in turn, feed central office 10. The switch located within the central office is connected, through trunk 7, to the wireline telephone network.

Each port would transmit time division multiplexed (TDM) bit streams on a predefined carrier frequency using quadrature phase shift keying (QPSK) modulation, with an inter-carrier spacing of 150 to 300 KHz and within a given operating frequency band situated somewhere between approximately 0.5 to 5 GHz. With this transmission range, a port could simultaneously serve as many as typically 20 separate locally situated portables that each carries digitized speech at a bit rate of 16 kbits/second. Here, ports 30, 40, 50 and 70 respectively serve portables 34 and 36; 42, 44, 46 and 48; 52, 54, 56 and 58; and 72, 74 and 76. The same TDM channels would be reused at different ports that are spaced sufficiently far apart, such as ports 30 and 70, to reduce co-channel interference to an acceptably low level but yet conserve valuable spectrum. However, adjacent ports would be situated sufficiently close together in order to provide an appropriate degree of overlap of their respective service areas thereby ensuring no loss of coverage occurs during call handoff. Furthermore, each port utilizes a suitable antenna, such as antenna 31 for port 30, to carry its TDM transmissions to its associated portables and receive TDMA bursts therefrom. Given the carrier frequencies being used, each of these antennas is relatively small and suitable for mounting on a utility or light pole or within an office building.

Inasmuch as system 5 replaces local copper drops and telephone cords with short range low power radio links, ambulatory callers are provided with completely tetherless access. Accordingly, through radio links 33 and 38, illustrative callers 35 and 37 located within respective residences 63 and 67 are completely free to move within the entire service area provided by system 5, i.e. that provided by ports 30, 40, 50 and 70, while advantageously maintaining continuity of their existing telephone conversations as well as being able to place calls through other ("non-home") ports as their travel progresses.

Each port continuously transmits on a TDM basis, while portables transmit in bursts on a TDMA basis to their associated port. Two different carrier frequencies are used to carry communication between each port and a portable: one frequency, frequency f1 for port 30, to carry communication from that port to each of its portables (downlink transmission) and another frequency, frequency f2 for port 30, to carry communication from each of these portables to this port (uplink transmission). Although adjacent ports use different pairs of frequencies, one particular uplink frequency being associated with each downlink frequency, these carrier frequencies are also reused for ports that are spaced sufficiently far apart from each other to conserve spectrum. By employing the procedure of the aforenoted co-pending patent application of two of the co-inventors of the present invention, J. C Chuang and N. R. Sollenberger, Ser. No. 619,059 filed Nov. 28, 1990, the downlink frequencies of all ports (and thus that port's associated uplink frequency) are assigned so as to maintain an acceptable low level of co-channel interference at each port.

As one of the portable users desires to connect to the telephone network, that person's portable must select a channel and initiate an access protocol. Selecting a channel (i.e. a port to communicate with) requires determination of the "best" port having a vacant time slot. A "best" port is one determined by the portable to have the highest signal to impairment (SIR) ratio or other quality measure. Generally, this is likely to be that port which is closest to the portable. Thus in FIG. 1, portable 74 would most likely access port 70. Various topological and meteorological conditions, however, can affect the quality of transmission so that the nearest port may not be the "best" port for a portable to access. Therefore, in FIG. 1, the "best" port for portable 74 may not be the nearest port 70, but may rather be port 40 or port 50. The "best" port may also not be available. Although the system shown in FIG. 1 shows only a limited number of portable units associated with each port, in actual practice, however, many more portables may be communicating through a port in a particularly high traffic area thereby occupying all the vacant time slots on the channel. The "best" port with respect to signal quality may not, therefore, be the "best" available port. The aforenoted patent application, Ser. No. 880,054, filed on May 7, 1992 by J. C. Chuang, co-inventor herein, discloses a method and apparatus for selecting a "best" available port.

This aforenoted method and apparatus used by a portable to select a "best" available port optimizes the downlink performance. In order to achieve good link performance in both the uplink and downlink directions, a power control algorithm is introduced. As previously noted, a dynamic power control algorithm and apparatus that controls the power output of the portable communicating with a port enables that port to receive an essentially constant power level from the transmitting portable that is independent of signaling condition. The power outputs from the plural transmitting portables can thus be maintained at only that level necessary for satisfactory performance on the uplink channel, thereby reducing interference to other ports which might otherwise be caused by portables that are transmitting at too high a level. Furthermore, by having the ability to dynamically adjust the power output of the portable unit, tracking to short-term fading can be achieved. In addition, power control reduces battery consumption at the portable.

The power control algorithm can be performed at each port (30, 40, 50, 70) in the system in FIG. 1, or can be performed at a situs common to more than one port, such as central office 10. Each radio link from a portable to a port is processed by the port receiver each digital frame to provide three measures for each received burst. As aforenoted, these three measures are a received signal strength indicator, RSSI, a quality measure, QM, and the word error indicator, WEI. The port receiver, or equipment common to plural port receivers, processes these three measures. The port receiver then transmits in each frame on the downlink channel to that portable, a power control bit, PC, that signals the portable to either increase or decrease its output power. In this way the output power of the portable is adjusted upward or downward in response to each burst received by the portable from the port.

Ideally, the uplink power would be controlled in response to a single measurement made at the port, as for example, a quality measure, QM, of the signal received uplink from the portable. Thus if the quality of the signal received by the port from the portable is "good", the uplink power could be decreased to a lower value, and if the quality is "bad", the uplink power could be increased to a higher value. Any quality measure, QM, will provide a a good relative measure of the signal-to-impairments ratio, wherein the impairments include co-channel interference, adjacent channel interference, intersymbol interference and thermal noise. The QM can be obtained by measuring the difference between the received signal samples and the expected noise-free samples, averaged over reach received burst. As such, it is a measure of the eye-opening of each received burst. As such, any QM will be a noisy parameter which, because of its rapid fluctuations, could effect unnecessary up and down power adjustments if it is used as the sole measurement to control the power output level of the portable. Advantageously, however, QM as an indicator of the signal-to-impairments ratio, will dramatically degrade in response to a strong and sudden interferer. As such, a call for an immediate increase in uplink power will be the response to such a drop in the QM in order to quickly compensate for the deleterious effects of the interferer on the uplink channel. The effects of such an interferer will be noticeable much sooner on the QM than on a received signal strength indicator measure (RSSI). As such, the response to a degraded QM will be much quicker than the response of the RSSI to the same impairment. The QM of the uplink signal received at the port is therefore one measure required for effective uplink power control.

A second measure required for effective uplink power control is the received signal strength indicator, RSSI, which is obtained by integrating the received power at the port from all portables using a particular frequency and time slot. This measure is a combination of the desired signal, noise, and interference over the entire burst, and as such includes the undesirable impairments that affect signal quality, and thus also the QM. By comparing the RSSI of the uplink signal received at the port with a threshold, $RSSI_{th}$, a determination can be made whether sufficient power is being received. If the RSSI is below $RSSI_{th}$ then additional uplink power is required. Comparing the RSSI of the received uplink signal with a fixed threshold can result in problems when the impairments on the link are very strong and contribute significantly to the RSSI value. In such a situation the RSSI may be high, and thus greater than the threshold, thereby calling for a power reduction, when in fact the signal component of the RSSI is weak and additional signal power is required. In order to avoid such undesirable situation, $RSSI_{th}$ is adaptively set in response to a word error indicator, WEI.

The word error indicator is a flag which is set to ONE if a codeword contained in a burst is received in error by the channel coder. If WEI is ONE, it can be reasonably assumed that a significant impairment on the uplink channel has caused that error, and that impairment has also affected the RSSI. Therefore, in order to effect an immediate increase in uplink power, the $RSSI_{th}$ is increased by x dB, where x can typically be two. Thus, if the RSSI is below this reset RSSI threshold, the downlink power control bit remains ONE in each frame, thereby calling for an uplink power increase, until that new RSSI threshold is reached. Once a coding error has been detected in one frame, it is highly likely, especially if caused by fading, that impairments will cause coding errors in the consecutive flames. Thus, if the WEI error flag is set to ONE, causing the RSSI threshold to be increased, error flags of ONE in subsequent flames are not used to trigger additional increases in the RSSI threshold. Such additional increases $RSSI_{th}$ would cause the uplink power to spiral upwards beyond a deskable level. Specifically, following a WEI error flag of ONE, subsequent WEI flags of ZERO or ONE are ignored within a window consisting of a fixed number of flames, N.

As described hereinabove, a transmission error in a frame causes $RSSI_{th}$ to be increased by x dB to effect an immediate increase in uplink power (except if that error falls within the window of N frames following a previous transmission error). On the other hand, if no error is detected, indicated by an WEI error flag of ZERO, then $RSSI_{th}$ is decreased. Specifically, $RSSI_{th}$ is decreased by ax dB in each frame in which the WEI error flag is ZERO (outside the window of N frames following a threshold increasing error), where a is much less than one, and can typically be 0.001. Thus, following an error event that triggers an increase of $RSSI_{th}$ by x dB, it will take approximately 1/a error-free events for the RSSI to be reduced to that same level of an error event under idealized conditions.

As described hereinabove, $RSSI_{th}$ is adaptively adjusted in response to the WEI. If the RSSI measure of a burst is below $RSSI_{th}$, additional uplink power is called for. If the RSSI measure is above the $RSSI_{th}$, a power decrease is called for unless the QM is below its threshold, $QM_{th}$, in which case a power increase is called for. A situation can arise, however, when a portable is too close to a port and is transmitting at a power level that saturates the port receiver thereby causing the QM to be degraded below $QM_{th}$. The response to a QM degradation would be a request for an increase in uplink power. In this situation, however, an opposite response is required. Therefore, in order to avoid such a situation, the RSSI is compared with a maximum RSSI, $RSSI_{max}$, which is the maximum permissible received power and is a fixed value that depends on the power level that saturates the port receiver. Therefore, if RSSI is greater than $RSSI_{max}$, a power reduction is called for regardless whether the QM is above or below $QM_{th}$.

Figure 2:
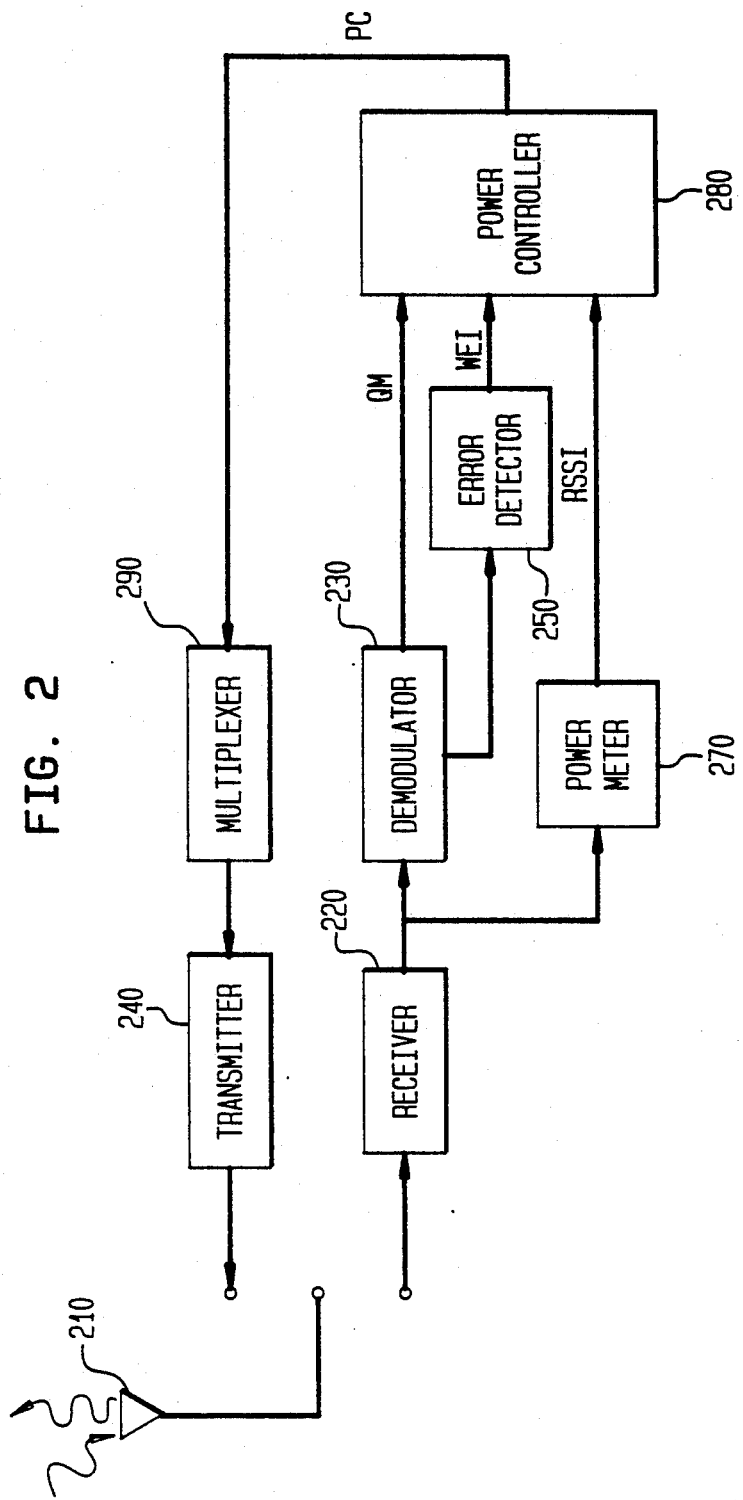
FIG. 2 is a block diagram of a port in such a system that incorporates apparatus necessary for deriving the QM, RSSI and WEI from each uplink frame and transmitting downlink to the portable, in response thereto, a power control bit, PC, to control the uplink power.

FIG. 2 is a block diagram of a port that incorporates the apparatus necessary for performing uplink power control. Only those elements needed for performing the functions of the present invention are shown. The port includes an antenna 210 for receiving uplink burst signals from the ports with which it is communicating, and for transmitting downlink burst signals to these same ports. The antenna 210 directs each received TDMA burst transmitted by a portable to a receiver 220 which is tuned to the uplink carrier frequency. The received analog signal is then input to a demodulator 230 which extracts therefrom digitized data that forms each TDMA burst. The demodulator 230 operates using coherent QPSK demodulation with differential decoding to produce a demodulated data burst. Demodulator 230 could comprise circuitry of the type described in the aforenoted U.S. Pat. No. 4,941,155 to J. C. Chuang and N. R. Sollenberger. That patent is incorporated herein by reference. As described in detail in that patent, symbol timing in TDM/TDMA portable radio system is performed by finding from a sixteen-times oversampled received signal, the particular timing instant which produces the largest vector sum of the X and Y components of expanded and collapsed differential phase angles of the received burst samples. This maximum vector sum, which is calculated by register 424 in FIG. 4 of this noted reference patent, is directly related to signal to impairment ratio and serves as the quality measure, QM, of the received burst from the transmitting portable. This QM of the received burst is shown present at the output of demodulator 230 in FIG. 2 herein.

The demodulated data burst produced by demodulator 230 is input to error detection circuit 250. Error detection circuit 250 could be one of several circuits such as the circuit described in the aforenoted U.S. Pat. No. 5,084,891 issued Jan. 28, 1992 to S. Ariyavisitakul, L. F. Chang and N. R. Sollenberger. That patent is also incorporated herein by reference. The error detection circuitry described and shown in FIG. 4 of that reference patent produces an output error flag which indicates whether or not errors are present in the received burst. This error flag, on output lead 326 in FIG. 4 of this reference patent, is equivalent to the word error indicator, WEI, at the output of error detector 250 in FIG. 2 herein.

The third burst measure is the RSSI which is produced by a power meter 270 connected to receiver 220. Power meter 270 integrates the received power over the entire received burst. This power includes both signal power and interference. The three measures, QM, RSSI and WEI are input to a power controller 280 which determines, using the procedures described hereinabove, whether a power control bit, PC, in the burst to be transmitted back to the portable should be a ONE or a ZERO. This power control bit, PC, is inserted by multiplexer 290 into the downlink burst to the communicating portable, to request either an increase or a decrease in the portable's transmitter power. If power controller 280 determines that additional power is required, then PC is set to ONE and multiplexer 290 inserts a ONE in the digital burst frame modulated and transmitted by the transmitter 240 to the portable. If power controller 280 determines that less power would be sufficient, then PC is set to ZERO and multiplexer 290 inserts a ZERO in the same frame position in the digital burst frame modulated and transmitted by the transmitter 240 back to the portable. In order to simplify FIG. 2, the digital information signal transmitted by the port to the portable is not shown.

Figure 3:
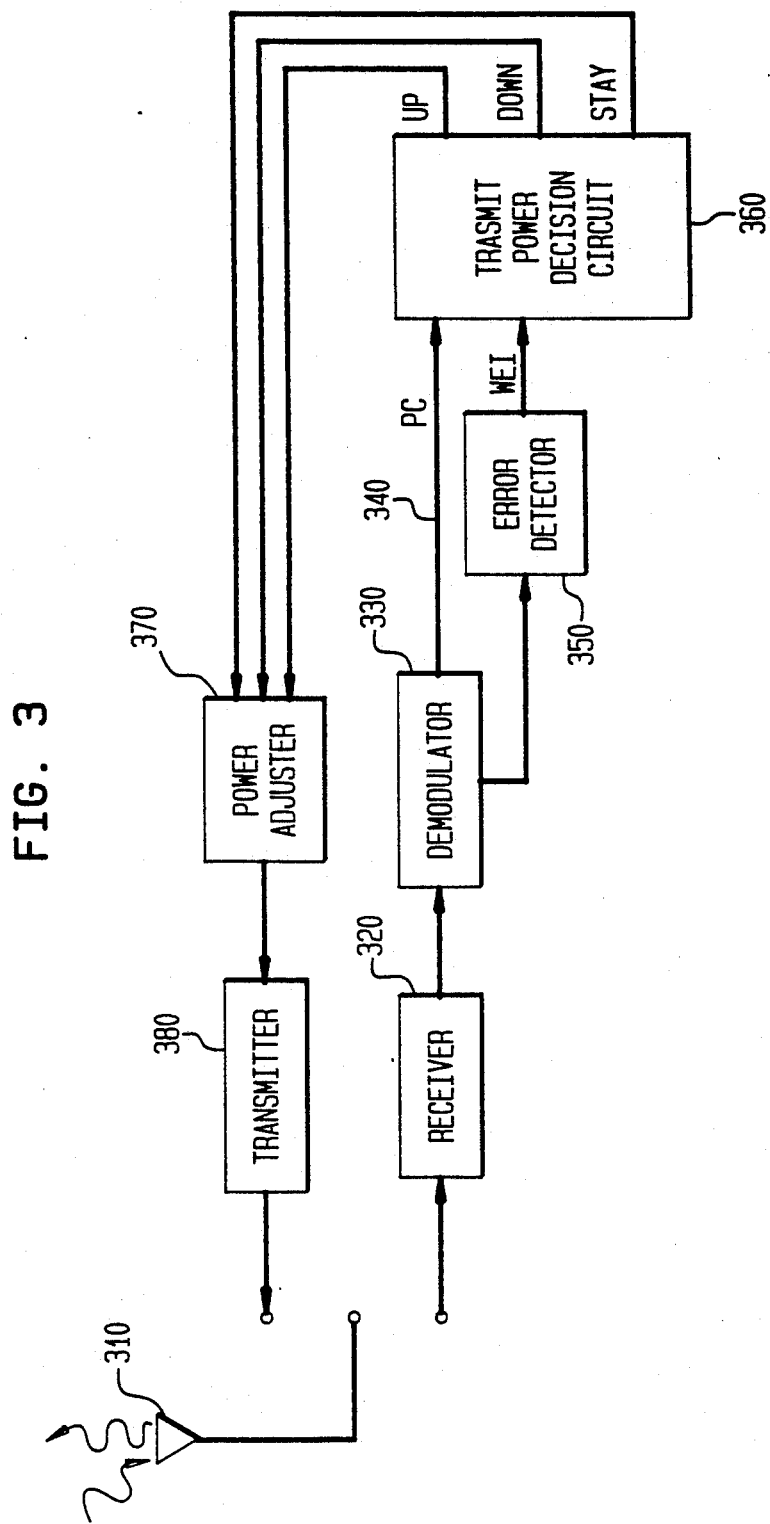
FIG. 3 is a block diagram of a portable in such a system that adjusts its output power in response to the power control bit, PC, received from the port in FIG. 2.

A block diagram of the portable unit that adjusts its power output in response to the received power control bit, PC, is shown in FIG. 3. In FIG. 3 antenna 310 receives the downlink signal from the port and directs same to a receiver 320 which is tuned to the downlink carrier frequency. The received analog signal is then input to a demodulator 330 which extracts therefrom the digitized data that forms each downlink TDMA burst. Demodulator 330, as demodulator 230 in FIG. 2, operates using coherent QPSK demodulation with differential decoding to produce a demodulated data burst. Demodulator 330, like demodulator 230, could comprise circuitry of the type described in the aforenoted U.S. Pat. No. 4,941,155 to J. C. Chuang and N. R. Sollenberger.

The power control bit, PC, transmitted with the burst, is extracted from the demodulated bit stream on lead 340. The demodulated bit stream is also input to an error detector 350, which is a similar circuit to error detector 250 in FIG. 2. The output of error detector 350 is a word error indicator, WEI, which is an error flag indicating whether a codeword contained within the burst has been received in error. The WEI and the power control bit are input to a transmitter power decision circuit 360. Based upon the PC and the WEI, decision circuit 360 decides whether the uplink power should be increased, decreased or remain the same. Specifically, if the WEI indicates an error condition, the PC transmitted by the port may also be in error. A decision is thus made to maintain the uplink power at its previous level. If, however, WEI is ZERO, indicating no detected error, the value of PC controls the decision process. Specifically, if PC is ONE a decision to increase the power is made, and if PC is ZERO a decision to decrease the power is made. The UP, DOWN, and STAY outputs of decision circuit 360 are connected to power adjuster 370, which is connected to transmitter 380. In response to the PC bit and WEI each frame, one of these outputs is energized and power adjuster 370 in response thereto increases, decreases, or maintains the transmit power level of transmitter 380.

Figure 4:
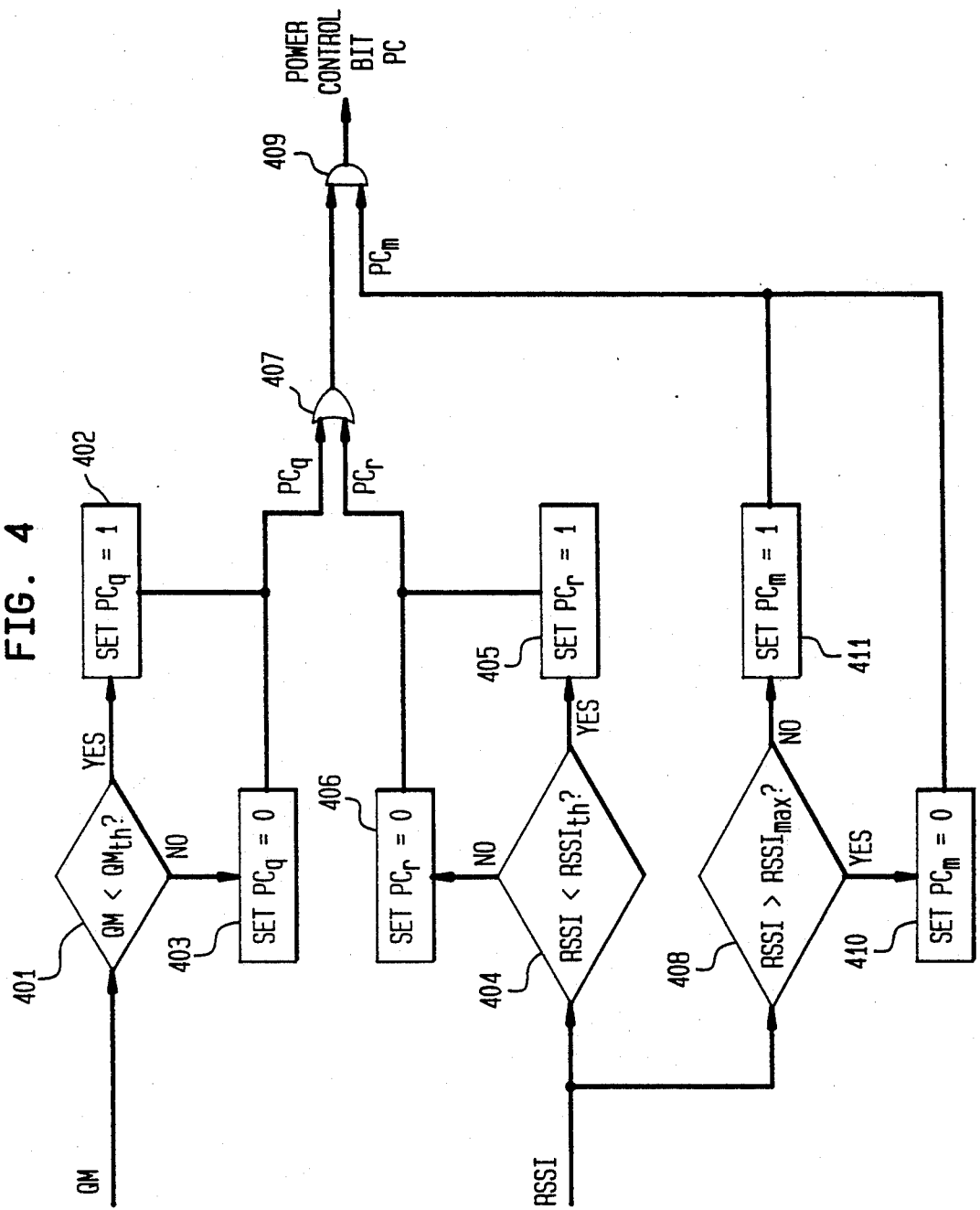
FIG. 4 is a flow-chart diagram of the method of the present invention used by the port of FIG. 2 for deriving the power control bit, PC, from the quality measure, QM, and the received signal strength indicator, RSSI, of the received uplink signal.
Figure 5:
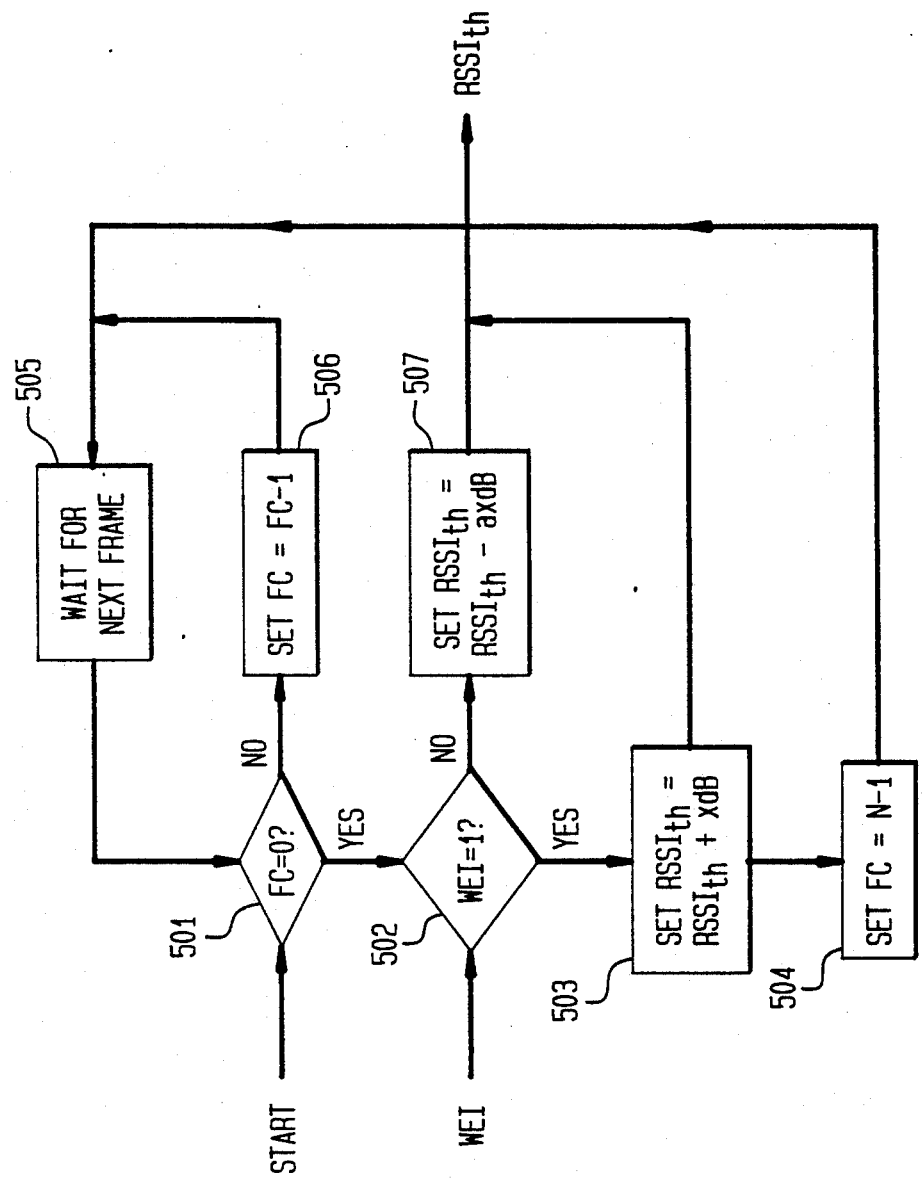
FIG. 5 is a flowchart diagram of a method for adjusting the RSSI threshold in accordance with the word error indicator, WEI, derived in each frame.

FIG. 4 is a flowchart summary of the method of the present invention for determining the power control bit, PC, from the QM and the RSSI of the uplink signal. FIG. 5 is a flowchart of the method for adjusting $RSSI_{th}$ in response to the WEI. The flowcharts in these FIGURES summarize the procedures described in detail hereinabove.

With reference to FIG. 4, decision box 401 compares the QM of the received burst with threshold value $QM_{th}$, which is a fixed conservatively set threshold. If QM is below $QM_{th}$, additional uplink power is likely required and an intermediate quality power control bit, $PC_q$, is set at ONE (box 402). If QM is above $QM_{th}$ there is sufficient uplink power with respect to the quality measure and $PC_q$ is set at ZERO (box 403). The RSSI of the received burst is compared with its threshold, $RSSI_{th}$, in decision box 404. If RSSI is below this threshold, the intermediate RSSI power control bit, $PC_r$, is set at ONE (box 405) to request additional uplink power. If RSSI is above this same threshold, $PC_r$ is set at ZERO (box 406).

If either $PC_q$ or $PC_r$ is set at ONE, an OR combination of these intermediate power control bits (shown as OR gate 407) produces a ONE output to request an increase in uplink power. If, however, RSSI is greater than the predetermined maximum RSSI, $RSSI_{max}$, (decision box 408), then an intermediate maximum RSSI power bit, $PC_m$, is set at ZERO (box 410), which when ANDed (shown by AND gate 409) with the ORed combination of $PC_q$ and $PC_r$, produces an output power control bit, PC, of ZERO, and thus a request for a decrease in uplink power. If, on the other hand, RSSI is less than the maximum received power, $RSSI_{max}$, $PC_m$ is set at ONE (box 411) and the output power control bit, PC, is equal to the ORed combination of $PC_q$ and $PC_r$.

With reference to FIG. 5, WEI is used to set $RSSI_{th}$ in accordance with the procedures previously described in detail. A frame count, FC, is established to count frames both at the start and after a WEI of ONE increase $RSSI_{th}$. If and only if the frame count, FC, is ZERO (decision box 501), which indicates that WEI has not yet been ONE or at least N frames have passed since the threshold has been increased, is the value of WEI checked. If FC is ZERO and WEI is ONE (decision box 502), then $RSSI_{th}$ is increased by x dB (box 503). The frame count, FC, is then set at the value N−1 (box 504). After a wait to the next frame (box 505) the FC input to decision box 501 is equal to N−1. The WEI input to decision box 502 is thus ignored and the frame count is decreased by ONE (box 506). After N−1 frames the count in box 506 reaches ZERO. At the Nth frame the FC input to decision box 501 is therefore ZERO and $RSSI_{th}$ is either decreased by ax dB (box 507) if WEI is ZERO, or is increased by x dB if WEI is ONE (box 503). In the former case, FC is maintained at ZERO for the next frame. In the latter case FC, is again reset at N−1 thereby forming a window of N frames during which interval $RSSI_{th}$ is neither increased nor decreased.

Although described hereinabove in conjunction with an uplink power control, the present invention could readily be used to control the downlink power transmitted by the port to the portable if the port includes apparatus for adjusting its downlink power on a per portable channel and time-slot basis. In addition to deriving the WEI as the portable did in the description hereinabove, the portable in such an arrangement would also measure the downlink RSSI and QM. As described hereinabove, these measures would be used to derive a power control bit each frame which would be transmitted uplink to the port. In response to such power control bit, the port would adjust its output power up or down on the channel and time-slot over which it is communicating with the portable. Apparatus of the type described above as being included in the port would be included in the portable, and the apparatus of the type described above as being included in the portable would be included in the port.

A single power control bit is used in the described embodiments for adjusting the uplink or downlink power up or down each frame. If additional bits are allocated per frame, a wider range of power adjustments could be made. For example, with two bits, the option of "maintain power output" could be included, or in the alternative, in response to certain conditions larger positive or negative power increments could be called for. Of course, such increased power flexibility would be to the detriment of the bandwidth available for the transmission of the information burst.

The above-described embodiment is illustrative of the principles of the present invention. Other embodiments may be devised by those skilled in the art without departing from the spirit and scope of the present invention.

What is claimed is:

1. In a TDM/TDMA digital telephony system having a plurality of fixed ports and a plurality of mobile portable units, each port having a transmitter for transmitting burst signals in a plurality of time-slots at an associated downlink frequency to at least one portable unit and a receiver for receiving burst signals at an associated uplink frequency from at least one portable unit, each portable unit having a transmitter for transmitting burst signals at any one of a plurality of uplink frequencies to any one of said plurality of ports and a receiver for receiving burst signals at any one of a plurality of associated downlink frequencies from any one of said plurality of ports, a method for dynamically adjusting the uplink (or downlink) power of the signal transmitted by a portable to a port (or by a port to a portable) to which it is communicating comprising the steps of:

determining a received signal strength indicator (RSSI) measure, a received signal quality measure (QM), and a word error indicator (WED from each uplink (or downlink) burst signal transmitted by the transmitter of a particular portable (or port) and received by the receiver at the port receiver (or portable receiver) with which the portable (or port) is communicating;

adjusting an RSSI threshold upward and downward in accordance with the WEI determined in each burst;

determining that additional uplink (or downlink) portable (or port) transmitter power is required if the QM is below a predetermined QM threshold or the RSSI is below the RSSI threshold, unless the RSSI is greater than a predetermined maximum RSSI value;

transmitting in each downlink burst (or uplink burst) a power control signal request for additional uplink (or downlink) portable (or port) transmitter power if it is determined that additional uplink (or downlink) portable (or port) transmitter power is required; and adjusting the uplink (or downlink) portable (or port) transmitter power upward if the portable (or port) receiver receives a burst including a power control signal request from the port (or portable) transmitter for additional transmitter power.

2. The method of claim 1 further comprising the steps of:

determining that reduced uplink (or downlink) portable (or port) transmitter power is required if both the QM is above the predetermined QM threshold and the RSSI is above the RSSI threshold, or if the RSSI is greater than the predetermined maximum RSSI value;

transmitting in each downlink burst (or uplink burst) a power control signal request for reduced uplink (or downlink) port (or portable) transmitter power if it is determined that reduced uplink (or downlink) portable (or port) transmitter power is required; and adjusting the uplink (or downlink) portable (or port) transmitter power downward if the portable (or port) receiver receives a burst including a power control signal request from the port (or portable) transmitter for reduced portable (or port) transmitter power.

3. The method of claim 2 wherein said power control signal transmitted each burst by said transmitter from said port (or portable) to said portable (or port) is a power control bit in the burst which is set to ONE to request additional uplink (or downlink) portable (or port) transmitter power and is set to ZERO to request reduced uplink (or downlink) portable (or port) transmitter power.

4. The method of claim 2 further comprising the steps of:

determining a WEI from each downlink (or uplink) burst signal transmitted by the transmitter of a port (or portable) and received by the receiver at the portable receiver (or port receiver) with which the port (or portable) is communicating; and ignoring the power control signal request transmitted by the port (or portable) transmitter in any burst which the WEI determined from the downlink (or uplink) burst signal indicates the presence of an error in the burst.

5. The method of claim 2 wherein the step of adjusting the RSSI threshold upward and downward in accordance with the WEI determined in each burst comprises the steps of:

adjusting the RSSI threshold upward by a first predetermined amount if the determined WEI indicates the presence of an error in the received burst; and adjusting the RSSI threshold downward by a second predetermined amount if the determined WEI does not indicate the presence of an error in the received burst.

6. The method of claim 5 further comprising the steps of:

adjusting the RSSI threshold neither upward nor downward for a fixed number of bursts following a burst in which the RSSI threshold has been adjusted upward.

7. The method of claim 5 wherein said first and second predetermined amounts are unequal.

8. The method of claim 4 wherein said first predetermined amount is larger than said second predetermined amount.

9. The method of claim 8 wherein said first predetermined amount is at least an order of magnitude larger than said second predetermined amount.

10. In a TDM/TDMA digital telephony system having a plurality of fixed ports and a plurality of mobile portable units, each port having a transmitter for transmitting burst signals in a plurality of time-slots at an associated downlink frequency to at least one portable unit and a receiver for receiving burst signals at an associated uplink frequency from at least one portable unit, each portable unit having a transmitter for transmitting burst signals at any one of a plurality of uplink frequencies to any one of said plurality of ports and a receiver for receiving burst signals at any one of a plurality of associated downlink frequencies from any one of said plurality of ports, a method for dynamically adjusting the uplink power of the signal transmitted by a portable to a port to which it is communicating comprising the steps of:

determining a received signal strength indicator (RSSI) measure, a received signal quality measure (QM), and a word error indicator (WED from each uplink burst signal transmitted by the transmitter of a particular portable and received by the receiver at the port receiver with which the portable is communicating;

adjusting an RSSI threshold upward and downward in accordance with the WEI determined in each burst;

determining that additional uplink portable transmitter power is required if the QM is below a predetermined QM threshold or the RSSI is below the RSSI threshold, unless the RSSI is greater than a predetermined maximum RSSI value; or that reduced uplink portable transmitter power is required if both the QM is greater than the predetermined QM threshold and the RSSI is greater than the RSSI threshold, or if the RSSI is greater than the predetermined maximum RSSI value;

transmitting in each downlink burst a power control bit that is set to ONE if it is determined that additional uplink portable transmitter power is required and is set to ZERO if it is determined that reduced uplink portable transmitter power is required; and adjusting the portable transmitter power upward if the portable receives from the port a burst with a power control bit of ONE and adjusting the portable transmitter power downward if the portable receives from the port a burst with a power control bit of ZERO.

11. The method of claim 10 wherein the step of adjusting the RSSI threshold upward and downward in accordance with the WEI determined in each burst comprises the steps of:

adjusting the RSSI threshold upward by a first predetermined amount if the determined WEI indicates the presence of an error in the received burst; and adjusting the RSSI threshold downward by a second predetermined amount if the determined WEI does not indicate the presence of an error in the received burst.

12. The method of claim 11 further comprising the steps of:

adjusting the RSSI threshold neither upward nor downward for a fixed number of bursts following a burst in which the RSSI threshold has been adjusted upward.

13. The method of claim 11 further comprising the steps of:

determining a WEI from each downlink burst signal transmitted by the transmitter of a port and received by the receiver at the portable receiver with which the port is communicating; and ignoring the power control bit transmitted by the port transmitter in any burst which the WEI determined from the downlink burst signal indicates the presence of an error in the burst.

14. The method of claim 11 wherein said first and second predetermined amounts are unequal.

15. The method of claim 14 wherein said first predetermined amount is larger than said second predetermined amount.

16. The method of claim 15 wherein said first predetermined amount is at least an order of magnitude larger than said second predetermined amount.

17. In a TDM/TDMA digital telephony system having a plurality of fixed ports and a plurality of mobile portable units, each port having a transmitter for transmitting burst signals in a plurality of time-slots at an associated downlink frequency to at least one portable unit and a receiver for receiving burst signals at an associated uplink frequency from at least one portable unit, each portable unit having a transmitter for transmitting burst signals at any one of a plurality of uplink frequencies to any one of said plurality of ports and a receiver for receiving burst signals at any one of a plurality of associated downlink frequencies from any one of said plurality of ports, a method for dynamically adjusting the downlink power of the signal transmitted by a port to a portable to which it is communicating comprising the steps of:

determining a received signal strength indicator (RSSI) measure, a received signal quality measure (QM), and a word error indicator (WEI) from each downlink burst signal transmitted by the transmitter of a particular port and received by the receiver at the portable receiver with which the port is communicating;

adjusting an RSSI threshold upward and downward in accordance with the WEI determined in each burst;

determining that additional downlink port transmitter power is required if the QM is below a predetermined QM threshold or the RSSI is below the RSSI threshold, unless the RSSI is greater than a predetermined maximum RSSI value; or that reduced downlink port transmitter power is required if both the QM is greater than the predetermined QM threshold and the RSSI is greater than the RSSI threshold, or if the RSSI is greater than the predetermined maximum RSSI value;

transmitting in each uplink burst a power control bit that is set to ONE if it is determined that additional downlink port transmitter power is required and is set to ZERO if it is determined that reduced downlink port transmitter power is required; and adjusting the port transmitter power upward if the port receives from the portable a burst with a power control bit of ONE and adjusting the port transmitter power downward if the port receives from the portable a burst with a power control bit of ZERO.

18. The method of claim 17 wherein the step of adjusting the RSSI threshold upward and downward in accordance with the WEI determined in each burst comprises the steps of:

adjusting the RSSI threshold upward by a first predetermined amount if the determined WEI indicates the presence of an error in the received burst; and adjusting the RSSI threshold downward by a second predetermined amount if the determined WEI does not indicate the presence of an error in the received burst.

19. The method of claim 18 further comprising the steps of:

adjusting the RSSI threshold neither upward nor downward for a fixed number of bursts following a burst in which the RSSI threshold has been adjusted upward.

20. The method of claim 18 further comprising the steps of:

determining a WEI from each uplink burst signal transmitted by the transmitter of a portable and received by the receiver at the port receiver with which the portable is communicating; and ignoring the power control bit transmitted by the portable transmitter in any burst which the WEI determined from the uplink burst signal indicates the presence of an error in the burst.

21. The method of claim 18 wherein said first and second predetermined amounts are unequal.

22. The method of claim 21 wherein said first predetermined amount is larger than said second predetermined amount.

23. The method of claim 22 wherein said first predetermined amount is at least an order of magnitude larger than said second predetermined amount.

24. In a TDM/TDMA digital telephony system having a plurality of fixed ports and a plurality of mobile portable units, each port having a transmitter for transmitting burst signals in a plurality of time-slots at an associated downlink frequency to at least one portable unit and a receiver for receiving burst signals at an associated uplink frequency from at least one portable unit, each portable unit having a transmitter for transmitting burst signals at any one of a plurality of uplink frequencies to any one of said plurality of ports and a receiver for receiving burst signals at any one of a plurality of associated downlink frequencies from any one of said plurality of ports, apparatus for dynamically adjusting the uplink power of the signal transmitted by a portable to a port to which it is communicating comprising at a port:

determining means for determining a received signal strength indicator (RSSI) measure, a received signal quality measure (QM), and a word error indicator (WEI) from each uplink burst signal transmitted by the transmitter of a particular portable and received by the receiver at the port receiver with which the portable is communicating;

threshold adjusting means for adjusting an RSSI threshold upward and downward in accordance with the WEI determined in each burst;

power control means for determining that additional uplink portable transmitter power is required if the QM is below a predetermined QM threshold or the RSSI is below the RSSI threshold, unless the RSSI is greater than a predetermined maximum RSSI value;

transmitting means for transmitting in each downlink burst a power control signal request for additional uplink portable transmitter power if said means for determining determines that additional uplink portable transmitter power is required;

and at the portable:

power adjusting means for adjusting the uplink portable transmitter power upward if the portable receiver receives a burst including a power control signal request from the port transmitter for additional transmitter power.

25. Apparatus in accordance with claim 24 wherein at said port said power control means further determines that reduced uplink portable transmitter power is required if both the QM is above the predetermined QM threshold and the RSSI is above the RSSI threshold, or if the RSSI is greater than the predetermined maximum RSSI value; and said transmitting means also transmits in each downlink burst a power control signal request for reduced uplink port transmitter power if said power control means determines that reduced uplink power is required; and at said portable said power adjusting means adjusts the uplink power downward if the portable receiver receives a burst including a power control signal request from the port transmitter for reduced portable transmitter power.

26. Apparatus in accordance with claim 25 wherein said power control signal transmitted each burst by said transmitting means in a port is a power control bit in the burst which is set to ONE to request additional uplink portable transmitter power and is set to ZERO to request reduced uplink portable transmitter power.

27. Apparatus in accordance with claim 25 wherein said portable further comprises means for determining a WEI from each downlink burst signal transmitted by the transmitter of a port and received by the receiver at the portable receiver with which the port is communicating; and said power adjusting means ignores the power control signal request transmitted by the port transmitter in any burst which the WEI determined from the downlink burst signal indicates the presence of an error in the burst.

28. Apparatus in accordance with claim 25 wherein said threshold adjusting means adjusts the RSSI threshold upward by a first predetermined amount if the determined WEI indicates the presence of an error in the received burst and adjusts the RSSI threshold downward by a second predetermined amount if the determined WEI does not indicate the presence of an error in the received burst.

29. Apparatus in accordance with claim 28 wherein said threshold adjusting means adjusts the RSSI threshold neither upward nor downward for a fixed number of bursts following a burst in which the RSSI threshold has been adjusted upward.

30. Apparatus in accordance with claim 28 wherein said first and second predetermined amount are unequal.

31. Apparatus in accordance with claim 30 wherein said first predetermined amount is larger than said second predetermined amount.

32. Apparatus in accordance with claim 31 wherein said first predetermined amount is at least an order of magnitude larger than said second predetermined amount.

33. In a TDM/TDMA digital telephony system having a plurality of fixed ports and a plurality of mobile portable units, each port having a transmitter for transmitting burst signals in a plurality of time-slots at an associated downlink frequency to at least one portable unit and a receiver for receiving burst signals at an associated uplink frequency from at least one portable unit, each portable unit having a transmitter for transmitting burst signals at any one of a plurality of uplink frequencies to any one of said plurality of ports and a receiver for receiving burst signals at any one of a plurality of associated downlink frequencies from any one of said plurality of ports, apparatus for dynamically adjusting the downlink power of the signal transmitted by a port to a portable to which it is communicating comprising at a portable:
determining means for determining a received signal strength indicator (RSSI) measure, a received signal quality measure (QM), and a word error indicator (WEI) from each downlink burst signal transmitted by the transmitter of a particular port and received by the receiver at the portable receiver with which the port is communicating;
threshold adjusting means for adjusting an RSSI threshold upward and downward in accordance with the WEI determined in each burst;
power control means for determining that additional downlink port transmitter power is required if the QM is below a predetermined QM threshold or the RSSI is below the RSSI threshold, unless the RSSI is greater than a predetermined maximum RSSI value;
transmitting means for transmitting in each uplink burst a power control signal request for additional downlink port transmitter power if said means for determining determines that additional downlink port transmitter power is required;
and at the port:
power adjusting means for adjusting the downlink port transmitter power upward if the port receiver receives a burst including a power control signal request from the portable transmitter for additional transmitter power.

34. Apparatus in accordance with claim 33 wherein at said portable said power control means further determines that reduced downlink port transmitter power is required if both the QM is above the predetermined QM threshold and the RSSI is above the RSSI threshold, or if the RSSI is greater than the predetermined maximum RSSI value; and said transmitting means also transmits in each uplink burst a power control signal request for reduced downlink port transmitter power if said power control means determines that reduced downlink power is required; and
at said port said power adjusting means adjusts the downlink power downward if the port receiver receives a burst including a power control signal request from the portable transmitter for reduced port transmitter power.

35. Apparatus in accordance with claim 34 wherein said power control signal transmitted each burst by said transmitting means is a power control bit in the burst which is set to ONE to request additional downlink port transmitter power and is set to ZERO to request reduced downlink port transmitter power.

36. Apparatus in accordance with claim 34 wherein said port further comprises means for determining a WEI from each uplink burst signal transmitted by the transmitter of a portable and received by the receiver at the port receiver with which the portable is communicating; and said power adjusting means ignores the power control signal request transmitted by the portable transmitter in any burst which the WEI determined from the uplink burst signal indicates the presence of an error in the burst.

37. Apparatus in accordance with claim 34 wherein said threshold adjusting means adjusts the RSSI threshold upward by a first predetermined amount if the determined WEI indicates the presence of an error in the received burst and adjusts the RSSI threshold downward by a second predetermined amount if the determined WEI does not indicate the presence of an error in the received burst.

38. Apparatus in accordance with claim 37 wherein said threshold adjusting means adjusts the RSSI threshold neither upward nor downward for a fixed number of bursts following a burst in which the RSSI threshold has been adjusted upward.

39. Apparatus in accordance with claim 37 wherein said first and second predetermined amount are unequal.

40. Apparatus in accordance with claim 39 wherein said first predetermined amount is larger than said second predetermined amount.

41. Apparatus in accordance with claim 40 wherein said first predetermined amount is at least an order of magnitude larger than said second predetermined amount.

* * * * *